United States Patent
Georgescu (10) Patent No.: US 12,353,452 B2
(45) Date of Patent: Jul. 8, 2025

(54) AUTOMATIC ERROR RECOVERY FOR PARSER

(71) Applicant: Oracle International Corporation, Redwood Shores, CA (US)

(72) Inventor: Adrian Georgescu, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/987,130

(22) Filed: Nov. 15, 2022

(65) Prior Publication Data

US 2024/0160647 A1    May 16, 2024

(51) Int. Cl.
*G06F 16/3332* (2025.01)

(52) U.S. Cl.
CPC ................ *G06F 16/3332* (2019.01)

(58) Field of Classification Search
CPC .................. G06F 16/3332; G06F 16/3338
See application file for complete search history.

(56) References Cited

U.S. PATENT DOCUMENTS

| | | | |
|---|---|---|---|
| 6,424,358 B1* | 7/2002 | DiDomizio | G06F 16/24 707/999.01 |
| 6,675,159 B1* | 1/2004 | Lin | G06F 40/205 |
| 8,375,048 B1* | 2/2013 | Wad | G06F 16/3338 707/767 |
| 2008/0270989 A1* | 10/2008 | Ahadian | G06F 8/33 717/126 |
| 2012/0144234 A1 | 6/2012 | Clark et al. | |
| 2012/0197864 A1* | 8/2012 | Bourdoncle | G06F 16/2428 707/711 |
| 2020/0097494 A1* | 3/2020 | Vertsel | G06N 5/048 |
| 2021/0165788 A1 | 6/2021 | Couto et al. | |
| 2021/0303386 A1 | 9/2021 | Kingsley et al. | |
| 2022/0075783 A1 | 3/2022 | Li et al. | |

FOREIGN PATENT DOCUMENTS

CN    108255837 B    9/2020

OTHER PUBLICATIONS

BNF Grammar for ISO/IEC 9075:1999—Database Language SQL (SQL-99) (Year: 2017).*

(Continued)

*Primary Examiner* — William Spieler
(74) *Attorney, Agent, or Firm* — Invoke (57) ABSTRACT

Systems for repairing parse errors in query language statements are disclosed. In response to identifying one or more errors during parsing, a system can perform error recovery operations, including selecting a target sequence of parsable elements from candidate target sequences identified by a grammar. The operations can also include, determining a modification for the first sequence of elements including parsable elements corresponding to the target sequence. The operations can further include repairing first query by applying the modification to the first sequence. Additionally, the operations include generating error report, including information indicating the modifications that allowed parsing to succeed and suggested corrections.

37 Claims, 6 Drawing Sheets

(56) References Cited

OTHER PUBLICATIONS

"PL/SQL Parser", Strumenta, Retrieved from https://strumenta.com/pl-sql-parser/, Retrieved on Jun. 27, 2022, 4 Pages.
"SparkSQL SQL Parser", Retrieved from https://www.sqlparser.com/sparksql-sql-parser.php, Retrieved on Jun. 27, 2022, 3 Pages.
"Vendor-specific offline SQL syntax check", Retrieved from https://www.dpriver.com/blog/list-of-demos-illustrate-how-to-use-general-sql-parser/vendor-specific-offline-sql-syntax-check/, Retrieved on Jun. 27, 2022, 1 Page.
Levine J., "Flex and Bison", 2009, pp. 294.
Michaelis M., "Custom Iterators with Yield", Retrieved from https://learn.microsoft.com/en-us/archive/msdn-magazine/2017/june/essential-net-custom-iterators-with-yield, vol. 32 No. 6, Jun. 2017, 13 Pages.
Sérgio Queiroz de Medeiros et al., "Automatic Syntax Error Reporting and Recovery in Parsing Expression Grammars", Oct. 2, 2019, 54 Pages.
Wollowski M., "Error Recovery", Sep. 2, 2020, 13 Pages.
Wu et al., "Design and implementation of a general SQL parser", Journal of Physics: Conference Series, 2010, 7 Pages.

\* cited by examiner

AUTOMATIC ERROR RECOVERY FOR PARSER

TECHNICAL FIELD

The present disclosure relates to database management, and, more specifically, to detecting and correcting errors in database queries.

BACKGROUND

Query languages are computer languages used to extract information from databases and information systems. Using a query language, such as the Structured Query Language (SQL), users can retrieve, manipulate, and transform data in relational databases. A relational database is a collection of related (e.g., two-dimensional) tables with a fixed number of named columns and any number of rows of data. Queries are textual statements entered by users requesting retrieval of a particular set of data from relational databases.

Query languages require query statements to conform to specific syntax declaring what data is to be retrieved, where to access the data, and optionally, how to transform the data. Translators (e.g., interpreters or compilers) are software programs that translate query language statements from human-readable text into computer-executable instructions. Translators interpret queries using parsers, which determine the parts of queries and describe the syntactic roles of the parts, as defined by the query language.

The process of parsing typically includes lexical analysis, syntactic analysis, and semantic parsing. Lexical analysis determines elements of a query (e.g., tokens) from a sequence of characters comprising a query statement by breaking the sequence into components. An element is the smallest unit in a statement that possesses some meaning (such as +, −, *, "function," or "new") in a language. Syntactic analysis applies rules of a grammar to identify expressions and define the particular order in which elements should be placed. A grammar is a set of rules that describe all possible sequences of element types in a formal language. A context-free grammar, such as the SQL syntax, comprises rules that map an input term to one or more output terms regardless of the input's context. A term that cannot be mapped violates the grammar rules. For example, a statement would violate the grammar rules if it lacked required elements, such as a missing target of the term "from" in the statement, "select adi from emp;" or if the statement used an element not included in the grammar, such as misspelling the term "from" as "form." Semantic parsing determines the meaning and implications of the validated expression. For example, semantic parsing checks whether information requested by a query statement exists in a database.

If a parser determines that a query statement is correct and complete, it will organize the elements of the statement into a parse tree, which is then used to generate computer instructions for extracting the relevant information from a relational database. However, constructing a syntactically correct query is difficult because query languages are complex and databases can contain vast amounts of information having multitudes of identifiers. Consequently, identifying and correcting errors in queries can be difficult for users. To address these issues, some translators employ automatic error recovery techniques to correct errors. However, these techniques typically handle specific errors on a case-by-case basis and provide limited feedback to users.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

Embodiments are illustrated by way of example and not by way of limitation in the figures of the accompanying drawings. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:

A. GENERAL OVERVIEW
B. SYSTEM ENVIRONMENT
C. SYSTEM ARCHITECTURE
D. REPAIRING AND REPORTING PARSE ERRORS
E. EXAMPLE EMBODIMENT
F. MISCELLANEOUS; EXTENSIONS
G. HARDWARE OVERVIEW

A. General Overview

Systems, methods, and computer-readable media disclosed herein determine repairs for parse errors in query language statements and other computer language statements. One or more embodiments receive query language statements from a user via a computer-user interface and attempt to parse the statements. In response to identifying one or more parsing errors during or after inputting of the statements, one or more embodiments perform an error recovery process that determines modifications for repairing the statements and allowing successful parsing. Embodiments can also present error reports to the user, including information indicating the modifications that allowed parsing and suggested corrections.

One or more embodiments can repair termination errors and scan errors. Termination errors include missing words or punctuation at an end of a statement. For termination errors, a system can determine a proper terminator (e.g., a sequence of one or more end-of-text element types) for completing the statements based on a context-free grammar. Scan errors occur in the body of a statement, such as between a prefix and a terminator. For scan errors, a system can determine all candidate element type sequences that make the statement parseable. The lengths of the element type sequence for scan errors include a predetermined number of terms (e.g., 4 elements), which improves the speed and computing resources consumed by the error recovery process by limiting a potential quantity of candidates.

One or more embodiments select a target element type sequence (e.g., a sequence of one or more types of elements) for repairing scan errors from the candidate element type sequences by determining similarities between the candidate element type sequences and the elements of the statement at the position of an error. Additionally, one or more embodiments can integrate the target element type sequence into the query language, instead of inserting the entire element type sequence, so as retain portions of the original statement. For example, embodiments can map a sequence of element types comprising the target element type sequence to elements of the original statement based on the grammar rules. Original elements mapped to the target element types sequence can be retained in the integration, rather than being replaced by the element types of the target element type sequence. Element types of the target element type sequence that are not mapped to original elements can be added to the statement. By doing so, embodiments generate repaired statements that maximize consistency with the original statements, which assists users in understanding the repairs made by the system.

Embodiments consistent with the present disclosure improve the performance of code editors by more efficiently performing parse error recovery than existing translators and compilers. As described above and detailed below, embodiments identify and repair open-ended errors at indeterminate locations in the statements, rather than repairing particular, predefined errors on case-by-case bases. Further, embodiments operate with large grammars by selecting candidate element type sequences that best match original query language statements. Moreover, embodiments provide an improved computer-user interface identifying errors on-the-fly (e.g., while users are inputting statements), which allows users to efficiently identify the causes and locations of errors in statements.

While this General Overview subsection describes various example embodiments, it should be understood that one or more embodiments described in this Specification or recited in the claims may not be included in this subsection.

B. System Environment

Figure 1:
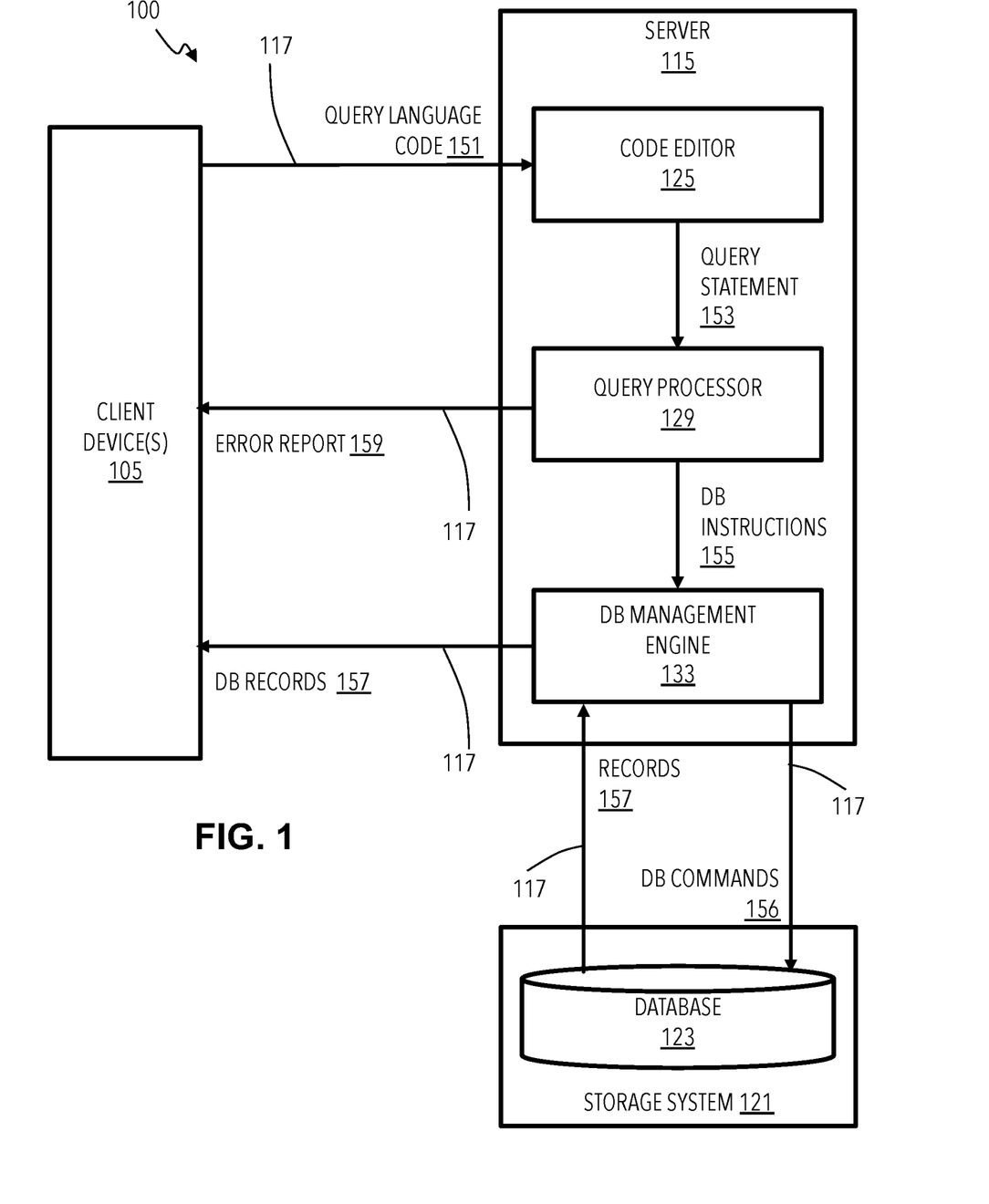
FIG. 1 illustrates a functional flow block diagram of an example system in accordance with one or more embodiments.

FIG. 1 shows a system block diagram illustrating an example of a computing environment 100 for implementing systems and processes in accordance with one or more embodiments. The computing environment 100 includes one or more client devices 105, a server 115, and a storage system 121 communicatively connected, directly or indirectly via one or more communication links 117. The communication links 117 can be wired and/or wireless information communication channels, such as the Internet, an intranet, an Ethernet network, a wireline network, a wireless network, a mobile communications network, and/or another communication network.

The storage system 121 can be a database system, including a database 123. The storage system can comprise one or more hard disk drives, flash drives, or the like. The database 123 may be any type of database, such as a hierarchical database, network database, or a relational database. One or more embodiments of the database 123 can be an SQL database.

The client device 105 can be one or more computing devices allowing users to access and interact with the server 115 and/or the storage system 121. For example, the client device 105 can be a personal computer, workstation, server, mobile device, mobile phone, tablet device, and/or other processing device capable of implementing and/or executing server processes, software, applications, etc. The client device 105 can include one or more processors that execute software or other computer-readable instructions and may include a memory to store the software, other computer-readable instructions, and data. The client device 105 can also include a communication device to communicate with the server 115 via the communication links 117. Additionally, the client device 105 can generate a computer-user interface enabling a user to interact with the server 115 using input/output devices. For example, by way of the computer-user interface, a user can connect to the storage system 121 via the server 115 to code and submit queries for accessing records maintained by the database 123.

The server 115 can be one or more computing devices that manage communication, access, and operations among the client device 105, and the storage system 121. One or more embodiments of the server 115 include a code editor 125, a query processor 129, and a database management engine 133. The code editor 125 and the query processor 129 can be components of an integrated development environment for software code, such as VISUAL STUDIO® by MICROSOFT® Corporation of Redmond, Washington.

The code editor 125 can be a text editor application or module for generating and editing statements in programming languages, query languages, and the like. For example, a user of the client device 105 can interact with the code editor 125 by providing query language code 151 to the computer-user interface to generate a query statement 153 and output the query statement 153 to the query processor 129.

The query processor 129 can be an application or module that parses, optimizes, and executes query language statements, such as query statement 153. When the query statement 153 is correct and complete, the query processor 129 can determine a parse tree for generating database instructions 155 to retrieve records 157 from the database 123. As described above and detailed below, when the query statement 153 is incorrect and/or unterminated, the query processor 129 can perform a parse error recovery that determines modifications rendering the query statement 153 parsable. Additionally, the query processor can output an error report 159 to the client device 105 identifying the errors in the query statement 153, the repairs applied to render the query statement 153 parsable, and candidate values that can be used for completing the query statement. One or more embodiments of the query processor 129 monitors users' inputs to the code editor and perform query error recovery on incomplete statements while users type the statements into the code editor 125.

The database management engine 133 can be a computer program, application, process and/or executable instruction that provide database services to other computer components/resources, such as the database 123. For example, the database management engine 133 can execute a database management system for interacting with and monitoring the database 123. One or more embodiments of the database management engine 133 can be a relational database management system (RDBMS) that controls the storage, organization, and retrieval of data from the database 123 stored in storage system 120 based on query statements 151. For example, based on the database instructions 155 the database management engine 133 can generate database commands 156 for retrieving records 157 from the database 123 and communicating the records 157 to the client device 105 in response to the query statement 153.

In a non-limiting example, a user of the client device 105 can, via user I/O devices and the computer-user interface (e.g., a graphic user interface), input query language code 151 to the code editor 125 to generate and edit query statement 153. For example, the user can input the following query statement 153:

select emp. from employees emp, departments dept;    (1)

In the present example, statement (1) is non-parseable because it is missing information after "emp." A system performing parse error repair disclosed herein can repair statement (1) by adding the element: "_aux_" that repairs the error. For example, statement (1) can be repaired as parseable statement (2) below.

select emp. aux from employees emp, departments dept;    (2)

In another example, embodiments can repair incomplete statement (3) below by terminating the statement with an element to generate statement (4).

select adi from    (3)

select adi from _aux_;    (4)

In the present example, the query processor 129 repairs statements (1) and (3) with "_aux_" at the respective points of error. The element type sequence can include one or more elements that meet semantic constraints of the grammar rules but lacks semantic information of the database system 123. For example, the element "_aux_" may not refer to any actual record of a database 123. The element type sequence can also refer to placeholder information in the database 123. For example, the element "_aux_" can identify a dummy table or a record lacking information or containing non-specific information. The element type sequence can also refer to actual tables or records in the database 123. For example, embodiments can select an element type sequence referring the actual information in the database 123 from a set of recently used tables or records. Other embodiments can intelligently select an element using a machine learning model trained to predict target information in the database 123 based on a training data set of past selections. It is understood that "_aux_" is merely an example and that other terms can be used, such as "_error_" or some other term indicating repair of a parse error. For example, embodiments can use a "*" symbol or the like functioning as a wildcard representing unlimited set of values, such as any alphabetical, numerical, or alphanumeric value.

C. System Architecture

Figure 2:
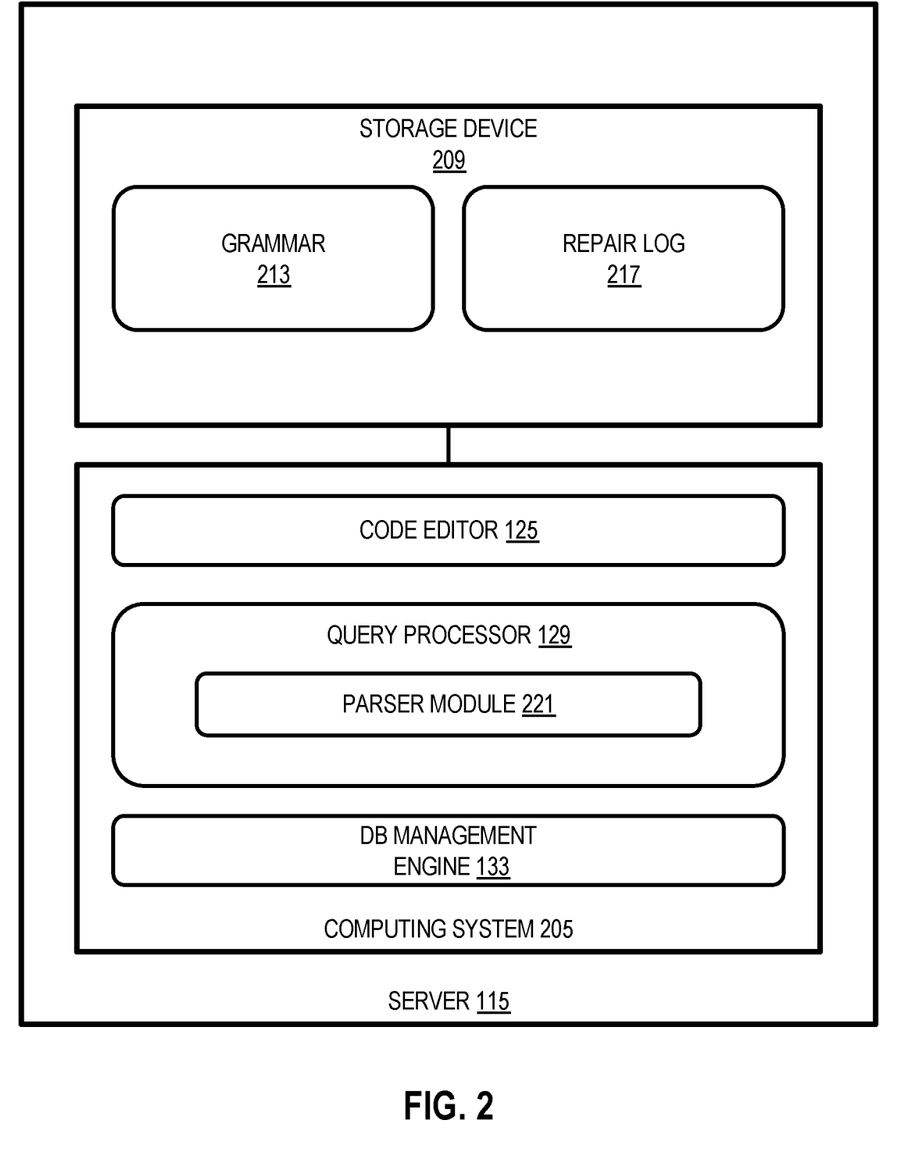
FIG. 2 illustrates a block diagram of an example system in accordance with one or more embodiments.

FIG. 2 shows a system block diagram illustrating an example of a server 115 in accordance with one or more embodiments. The server 115 can be the same or similar to that described above. The server 115 includes hardware and software that perform the processes and functions disclosed herein. The server 115 can include a computing system 205 and a storage system 209. The computing system 205 can include one or more processors (e.g., microprocessor, microchip, or application-specific integrated circuit).

The storage system 209 can comprise one or more computer-readable, non-volatile hardware storage devices that store information and program instructions used by the processes and functions disclosed herein. For example, the storage system 209 can include one or more flash drives and/or hard disk drives. One or more embodiments of the storage system 209 can host a grammar 213 and a repair log 217. The grammar 213 can be a context-free grammar. For example, the grammar 213 can be the SQL or PLSQL grammars. The repair log 217 can be a repository of parse error recovery information generated by the query processor 129, including information for generating error reports (e.g. error report 159).

The computing system 205 can execute a code editor 125, a query processor 129, and a database management engine 133, which can be the same or similar to those previously described above. Additionally, the query processor 129 can include a parser module 221. The parser module 221 can be hardware, software, or a combination thereof that parses statements (e.g., query statement 153) using the grammar 213. One or more embodiments of the parser module 221 can be an Earley parser. The Earley parser is an algorithm for parsing sequences that belong to a given context-free grammar, such as the SQL grammar (e.g., grammar 213). Additionally, the parser module 221 can perform error recovery and generate error reports, as described above, and detailed below.

It is noted that the server 115 can comprise any general-purpose computing article of manufacture capable of executing computer program instructions installed thereon (e.g., a personal computer, server, etc.). However, the server 115 is only representative of various possible equivalent-computing devices that can perform the processes described herein. To this extent, in embodiments, the functionality provided by the server 115 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. Multiple components may be combined into one application and/or machine. Operations described with respect to one component may instead be performed by another component.

D. Repairing and Reporting Parse Errors

Figure 3A:
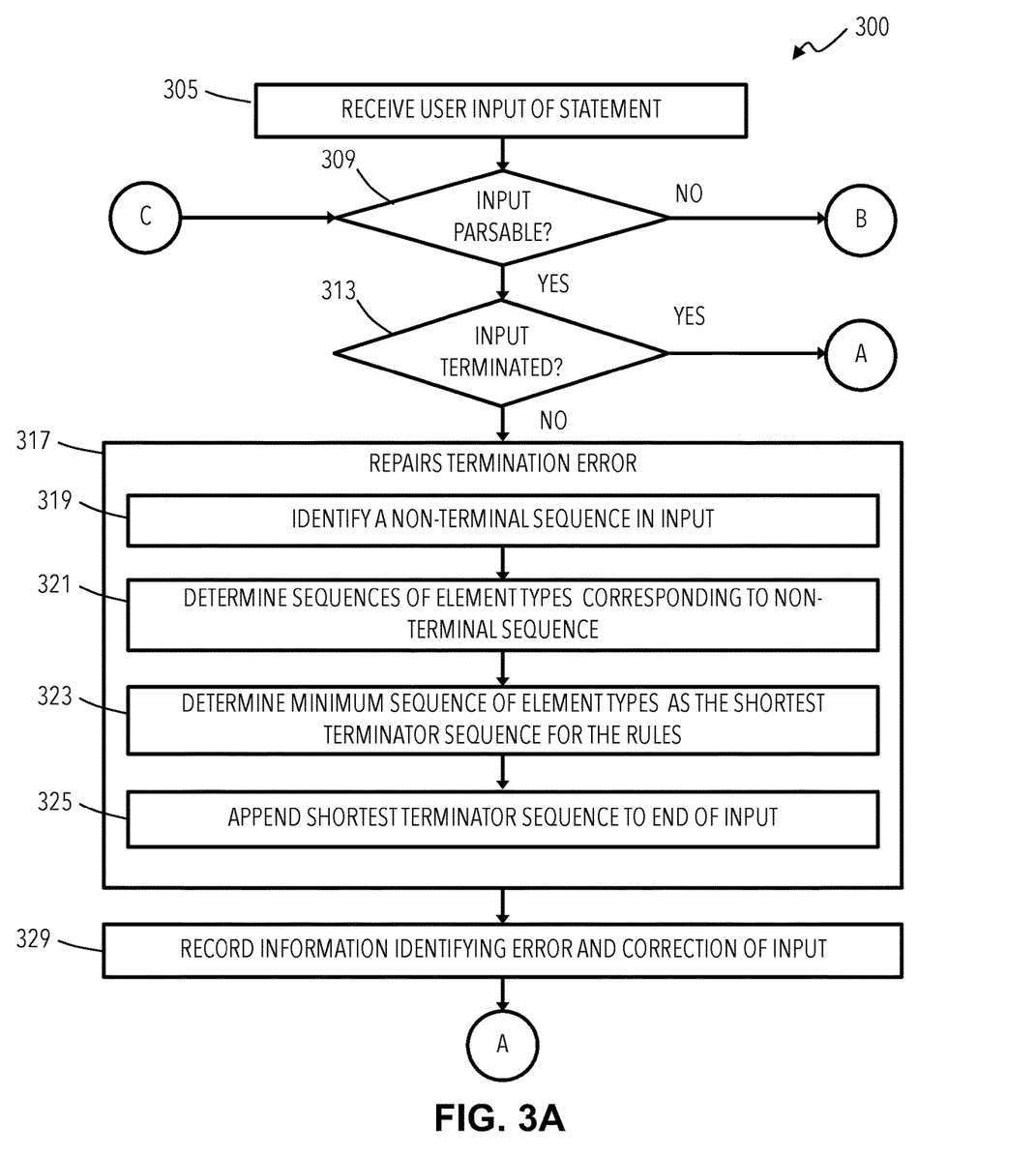
FIGS. 3A, 3B, and 3C illustrate a set of operations of an example process for determining repairs for parse errors in accordance with one or more embodiments.
Figure 3B:
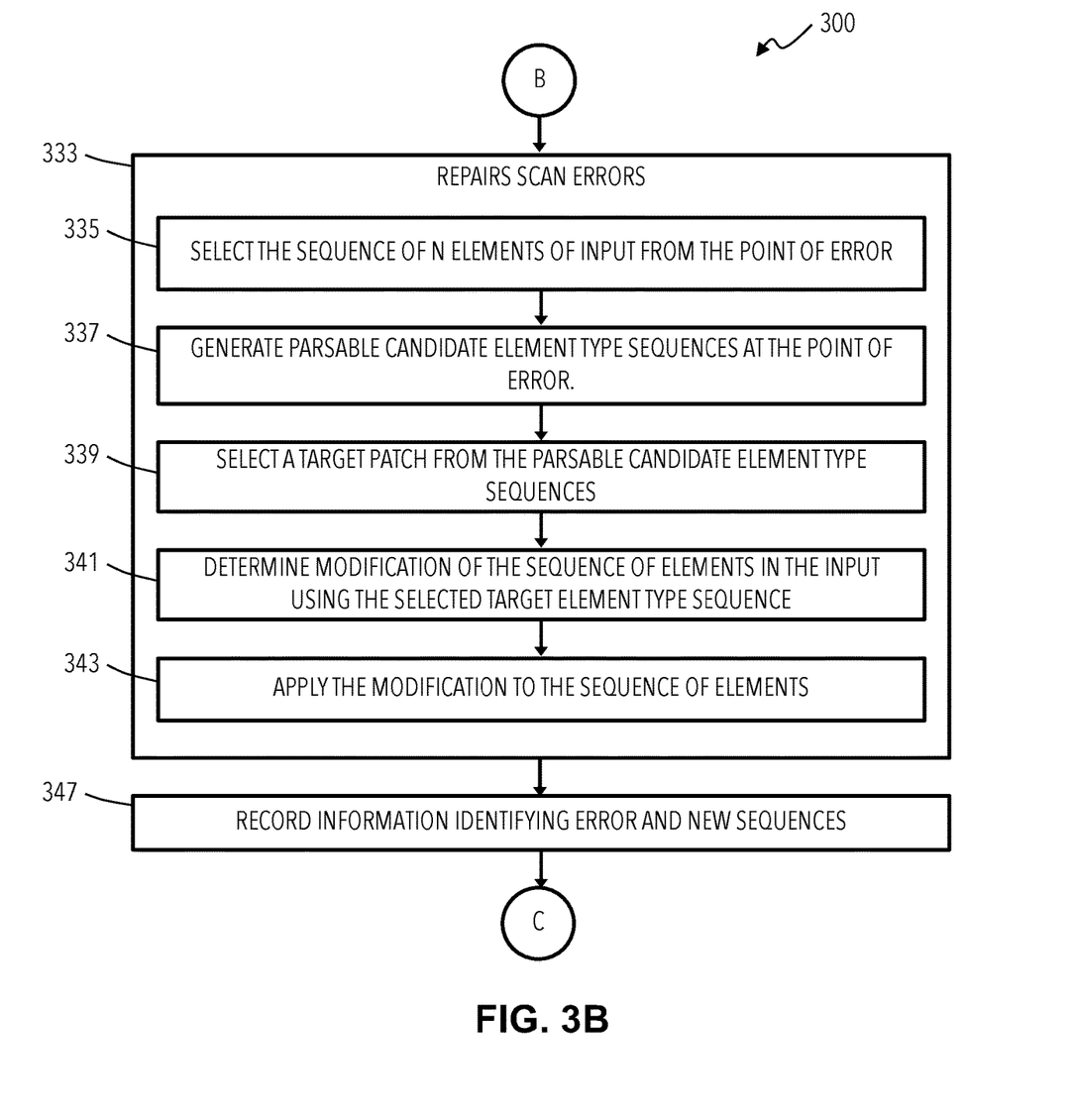
Figure 3C:
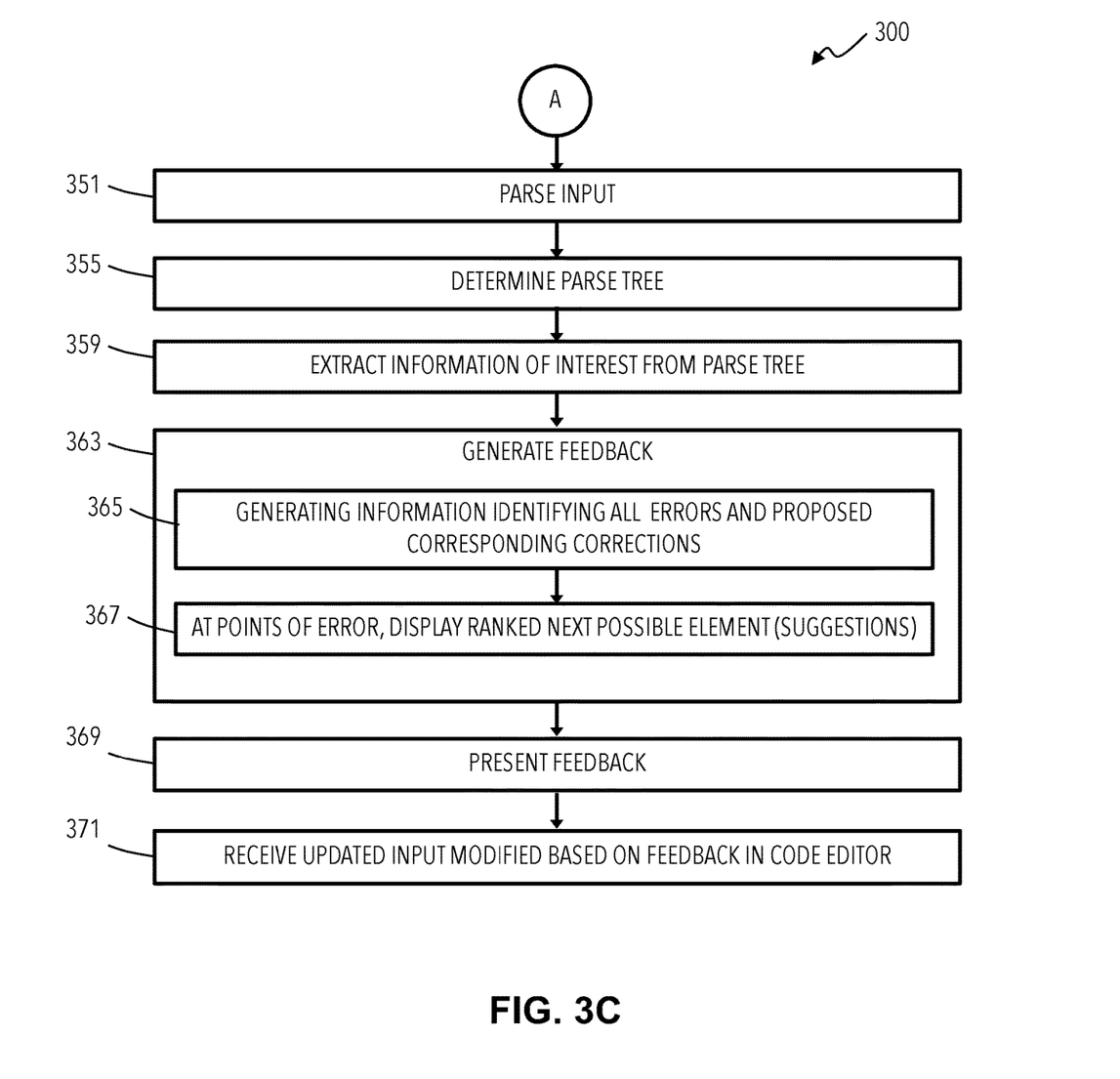

The flow diagrams in FIGS. 3A-3C illustrate functionality and operations of systems, devices, processes, and computer program products according to various implementations of the present disclosure. Each block in FIGS. 3A-3C can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A-3C. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

Referring to FIG. 3A, at block 305, a system (e.g., server 115) receives a user input (e.g., query language code 151) via a computer-user interface for generating a statement (e.g., query statement 153). For example, a developer using a client device (e.g., client device 105) can input a statement in a user interface of a code editor (e.g., code editor 125). One or more embodiments perform the process 300 on-the-fly while the statement input by the user at block 305 is incomplete. For example, during inputting of the statement into the code editor, the system can execute operations of the process 300, as described below. The system can initiate the operations responsive to input of individual elements (e.g., followed by keyboard input of a space or a terminator) or periodically (e.g., every 1 second). Additionally or alternatively, the user can manually trigger parsing of the statement.

At block 309, the system (e.g., executing query processor 129) determines whether the input received from the user at block 305 is parseable by a parser (e.g., parser module 221). As described above, the parser interprets the sequence of elements comprising the input and organizes the elements into a parse tree representing the semantic structure of the sequence using predefined grammar rules (e.g., grammar 213). Using, for example, an Earley parser algorithm, the system can progressively traverse the input sequence element-by-element comparing the sequence at a current location to the grammar rules and attempting to identify sequences of element types in the grammar rules corresponding to the sequence of elements in the input at each location. The element types can include, for example, specific keywords, table identifiers, or field identifiers. If the parser completes the traversal by matching the entire input to a parsable sequence of element types, the input is parsable. However, if the parser fails to identify a parsable sequence of element types in the grammar matching a location in the input during the traversal, then the input is unparsable (i.e., not parsable) and the location in the sequence of elements in the input at which the parsing failed can identified as incomplete or incorrect.

If the system determines the input is unparsable (e.g., block 309 is "No"), then the process 300 proceeds to block 333 via off-page connector "B," as described below. If the input is parseable (e.g., block 309 is "Yes"), then the process 300 proceeds to block 313. At block 313, the system determines whether the input received at block 305 is terminated. The input is unterminated when it is incomplete, such that it is missing one or more elements (e.g., terms or punctuation) at the end of an input, as required by the grammar. If the system determines the input is terminated (e.g., block 313 is "Yes"), then the process 300 proceeds to block 351 via off-page connector "A." On the other hand, if the input is unterminated (e.g., block 313 is "No"), then the process 300 proceeds to block 317.

At block 317, the system repairs the termination error determined at block 313 by determining a terminator for the input based on the grammar. Correcting the termination error can include, at block 319, identifying a non-terminal sequence of elements in the input. Non-terminal elements are elements that appear on both the right-hand side and the left-hand side of a grammar rule. Whereas terminals are elements that will appear only on the right-hand side of a grammar rule. The non-terminals that appear only on the left-hand side but not on the right-hand side are called top or start symbols and are the starting point of a parse recognition process.

At block 321, the system determines a set of sequences of element types (i.e., element type sequences) of the grammar corresponding to the non-terminal sequence of elements identified at block 319. Correcting the termination errors can further include, at block 323, determining shortest termination sequence of element types as a minimum expansion of the non-terminal sequence identified at block 319 using the grammar. For example, below are example sequences of element types expanding the "case expr" non-terminal symbol in the grammar:

case_expr: 'CASE' case_expr_alt_seq 'END'
case_expr: 'CASE' case_expr_alt_seq ELSE_expr_opt 'END'
case_expr: 'CASE' pls_expr case_expr_alt_seq 'END'
case_expr: 'CASE' pls_expr case_expr_alt_seq ELSE_expr_opt 'END'

Assuming that 'CASE' and 'END' are terminals, then the shortest expansion for these elements is one (1), which is the symbol itself. For non-terminals, the minimum expansion length can be one (1). In the case above, the rule with the minimum expansion would logically be the first. Accordingly, the minimum expansion for "case_expr" would correspond to the minimum expansion of "case_expr_alt_seq". (Min("case_expr")=1+Min("case_expr_alt_seq")+1). Based on this, the system can determine the shortest terminator element type sequence for the unterminated input.

Additionally, correcting the end of text errors can include, at block 325, appending the minimum expansion determined at block 323 at the end of the non-terminal sequence identified at block 319. At block 329, the process 300 records information identifying the error corrected at block 317 and the repair appended at block 325. Recording the information can include generating or updating a log of errors and repairs (e.g., repair log 217) for the input identifying the type or error, the location of the error, and the minimum expansion determined at blocks 323 and 325. The process 300 can then proceed to block 351 of FIG. 3C, as indicated by off-page connector "A."

Referring to FIG. 3B, at block 333 the process 300 repairs scan errors in the input received at block 305. Scan errors occur in the middle of the input, wherein all elements in the sequence up to a position have been properly recognized according to the grammar, and the next element is one that does not match any element types of the grammar rules in that context. Repairing the scan errors can include generating a set of parsable candidate element type sequences for modifying the location of the error determined at block 309. The candidate element type sequences can be a set of element type sequences from the grammar having a predetermined length (N). One or more embodiments set the length (N) to, for example, 3 or 4 element types to limit the quantity of candidate element type sequences in the set. Due to the large size of grammars, generating element type sequences of N element types can be computationally expensive. For example, for embodiments involving SQL expressions, the number of element type sequences including 4 element types can reach 100,000,000. Accordingly, embodiments can limit N to a value, such as 3 or 4 element types. Other embodiments limit the candidates to a predetermined maximum quantity (e.g., 10, 100, or 1,000 candidate element type sequences). Once the element type sequence of the input has been repaired, the system continues parsing the location of the error identified at block 309.

More specifically, repairing scan errors at block 333 can include, at block 335, selecting a sequence of N elements (e.g., N=4) of the input from the point of error. Repairing the scan errors can also include, at block 337, generating, based on the grammar, parsable candidate element type sequences of N element types at the point of error. Correcting the scan errors can further include, at block 339, selecting a target element type sequence from the parsable candidate element type sequences determined at block 337. One or more embodiments select the target element type sequence including element types having the highest similarity to the original sequence elements at the point of error. For example, the system can use a similarity algorithm, such as the Jaccard index algorithm, the Sorensen-Dice algorithm, or the like). Also, to conserve computing resources, one or more embodiments compute a maximum achievable "similarity" coefficient for each error. If an element type sequence matching the maximum achievable similarity coefficient is identified, the system stops the computation and selects that candidate element type sequence as the target element type sequence. Because the system found one element type sequence that has the maximum coefficient possible, no other element type sequence can achieve a better coefficient. By tightly coupling the element type sequence generation algorithm with the maximum similarity coefficient, the system avoids consuming resources by evaluating element type sequences that cannot have a higher similarity coefficient. These approaches allow a recovery time of about around 100 milliseconds or less. Additionally or alternatively, one or more embodiments select the candidate element type sequence at block 339 from the candidate element type sequences generated at block 337 involving the least number of element types additions to the sequence of elements in the input identified at block 309. Also, one or more embodiments select the target element type sequence including the greatest amount of commonly used element types among the candidate element type sequences (based on, e.g., historical information stored in repair log 217).

Correcting the scan errors can further include, at block 341, determining a modification of the sequence of elements in the input using the element type sequence of the target element type sequence selected at block 339. The modification can comprise a set of parsable elements corresponding to the target element type sequence. One or more embodiments can determine the modification by integrating the element types of the target element type sequence into the input, instead of replacing with the entire element type sequence, so as to retain elements of the input query. For example, embodiments can map a sequence of element types comprising the selected element type sequence to terms of the original input based on the grammar rules. Original terms mapped to the target element type sequence can be retained in the integration, rather than being replaced by the element types of the target element type sequence. Terms of the target element type sequence that are not mapped to terms of the original input can be added to or deleted from the input. By doing so, repaired inputs maximize consistency with the original inputs.

Correcting the scan errors can further include, at block 343, applying the modification determined at block 341 to generate new sequence of elements in the input based on the target element type sequence. One or more embodiments, create a copy of the input, without modifying the original input. For example, the original input received at block 305 can be preserved and the system can repair a copy of the input in blocks 317 and 333. At block 347, the system records information identifying the error corrected at block 333 and the sequences created at block 343 in a log (such as repair log 217), which can be the same or similar to the operations described above regarding block 329. The process 300 can then iteratively return to block 309 and attempt to parse the input including the repair applied in block 333.

Referring to FIG. 3C, at block 351 the process parses the input received at block 305, which may have been corrected in blocks 317 and 333. At block 355, the process 300 determines a parse tree for the input. At block 359, the process 300 extracts information from the parse tree for retrieving information requested by the input received at block 305. At block 363, the process 300 generates feedback. If the input received at block 305 was parsable without any errors (e.g., block 309 was "Yes" and block 313 was "Yes"), then the system can issue feedback to the user via the user interface indicating that that input was correct, and parsing was successful. On the other hand, if the input received at block 305 was corrected, then the system can issue feedback to the user via the user interface indicating that parsing of the input failed and recovered. Generating the feedback can include, at block 365, generating information identifying the quantity and types of errors determined at blocks 309 and 313, and the corresponding corrections identified at blocks 317 and 333. For example, the system can generate a report (e.g., error report 159) indicating the number of errors recovered and the corrections used to make the input parsable. Generating the feedback can also include, at block 367, at all points of error, ranked next possible element (e.g., suggestions) that can be used for advancing the parsing of the user input. The candidate values can be placeholder values, such as a table name, or wild card values. Additionally, the system can determine the candidate values based on grammar rules or a predictive model. For example, one or more embodiments can maintain a library (e.g., repair log 217) storing past errors, corresponding corrections, and a count of a number of times each error/correction pair has been applied. The system can rank the candidate values based on their corresponding counts. Additionally or alternatively, embodiments can intelligently suggest candidate values using a machine learning model trained using a training data set associating previously used values or combinations of values with a frequency of use in query statements parsed by the system. At block 369, the system presents the feedback generated at block 363 via the computer-user interface. At block 371, the system receives an updated statement modified based on the feedback generated at block 363. The process 300 can repeat using the updated statement received at block 371.

E. Example Embodiment

The following non-limiting example embodiment performs multiple error recovery, multiple error reporting, parse recovery handling, and automatic parse recovery.

A user of client device (e.g., client device 105) can, using a code editor (e.g., code editor 125), input the following portion of a query:

select a. from b where c  (5)

As the user enters the query input (5) into the code editor, or in response to the user's instruction, the system can begin the parsing the query input using a grammar (e.g., grammar 213) by converting the query input to a sequence of elements and then incrementally traversing the sequence element-by-element. While traversing, the translator can compare the sequence of elements comprising the input at a current location to element type sequences included in the grammar and attempt to identify sequences matching the sequence at the individual locations as they are traversed. While parsing, the system may determine the query input is not parsable because the translator fails to find a match in the grammar in the sequence "select a." in the query input.

In response to identifying the unparsable sequence, the system can select a sequence of four (4) elements in the query input starting from the point of the error. For example, "from b where c". Additionally, the system can generate candidate element type sequences comprising combinations of elements from the grammar having a predetermined length of 4 that would be parseable at the location of the unparsable sequence. For example, the system can identify the following candidate element type sequences in the grammar:

(A) _aux_ from b where
(B) * from b where
(C) _aux_ _aux_ from b
(D) * from _aux_.

Here the "_aux_" represents an identifier (e.g. a name of a database object). The above candidate element type sequences are merely a small set used for example, and it is understood that the system could identify more candidate element type sequences (e.g., 10,000 element type sequences or more). For each of the candidate element type sequences, the system computes a similarity between the candidate element type sequence and the original sequence using a similarity algorithm, as previously described. For example, the below table illustrates the above candidate element type sequences with corresponding similarity coefficients for the query input (5):

| Candidate | Coefficient |
|---|---|
| (A) | 90 |
| (B) | 90 |
| (C) | 23 |
| (D) | 67 |
| Max. Similarity | 90 |

The system determines the element type sequence with the highest "similarity" coefficient to the sequence "_aux_ from b where" at the location of the error in the query input. Some embodiments determine a maximum achievable "similarity" coefficient. If there is a candidate element type sequence matching that number, the system stops the computation and selects that element type sequence. Based on the similarity coefficients, the system selects the element type sequence with highest similarity to the sequence "from b where c" at the point of error. In the present example, once "_aux_ from b where" is found, and given that the sequence matches the maximum possible similarity coefficient, the generation of further sequences is stopped, and the "_aux_ from b where" sequence is chosen for repair. Notably, in the tables above, sequence (B) ("* from b where") has the same coefficient as sequence (A) ("_aux_ from b where"). However, the system will pick the first sequence generated for a certain similarity coefficient value, which conserves computing resources and increases efficiency of error recovery.

Using the selected sequence, the system repairs the input (5). As previously described, embodiments can map the terms of the selected element type sequence to terms of the original query input based on the grammar rules. Original terms mapped to the target element type sequence can be retained in the integration, rather than being replaced by the terms of the target element type sequence. Terms of the target element type sequence that are not mapped to terms of the original input can be added to the input. In the present example, the original 4 elements sequence "from b where c" is replaced with the repaired (e.g., "merged") sequence "_aux_ from b where c". The repaired sequence to be parsed is: "select a._aux_ from b where c". The repaired sequence will parse up to the end. However, the statement will be incomplete according to the grammar. That means that we have an end of text error that will be repaired adding the shortest possible element sequence termination. The final parsable sequence will look like: "select a._aux_ from b where c LAX;" which will be a correct and complete statement from the perspective of the SQL grammar.

The system can parse the repaired input received at block 305 and determine a parse tree for the input and generate an error report as feedback. The feedback can indicate the number of errors recovered, the corrections used to make the input parsable, and ranked next element suggestions based on grammar rules or machine learning model. In the present example, the feedback can include:

Parse failed and recovered
2 errors have been found.
>>>>>>>>>> Error <<<<<<<<<<
There is no possible parse follow up at the token "." in the sequence "select a. from b where c" :
Parse recovered
The original tokens:    from b where c,
have been replaced with:    _aux_ from b where c
Possible follow up tokens:
  identifier
  'PRIOR'
  'EXISTS'
  'DELETE'
  'CURRENT'
  'INTEGER'
  'VARCHAR2'
  'TIME'
  'STANDARD'
  'SQL'
  ...
>>>>>>>>>> End <<<<<<<<<<
>>>>>>>>>> Error <<<<<<<<<<
Statement is incomplete at token "c" in the sequence "select a. from b where c"
Parse recovered
Following tokens have been added to the original set:   LAX ;
Possible follow up tokens:
  'IS'
  'WITH'
  'LIKE'
  'BETWEEN'
  'NOT'
  'IN'
  'SIZE'
  'MULTISET'
  'ALLOW'
  'LAX'
  ...
>>>>>>>>>> End <<<<<<<<<<

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
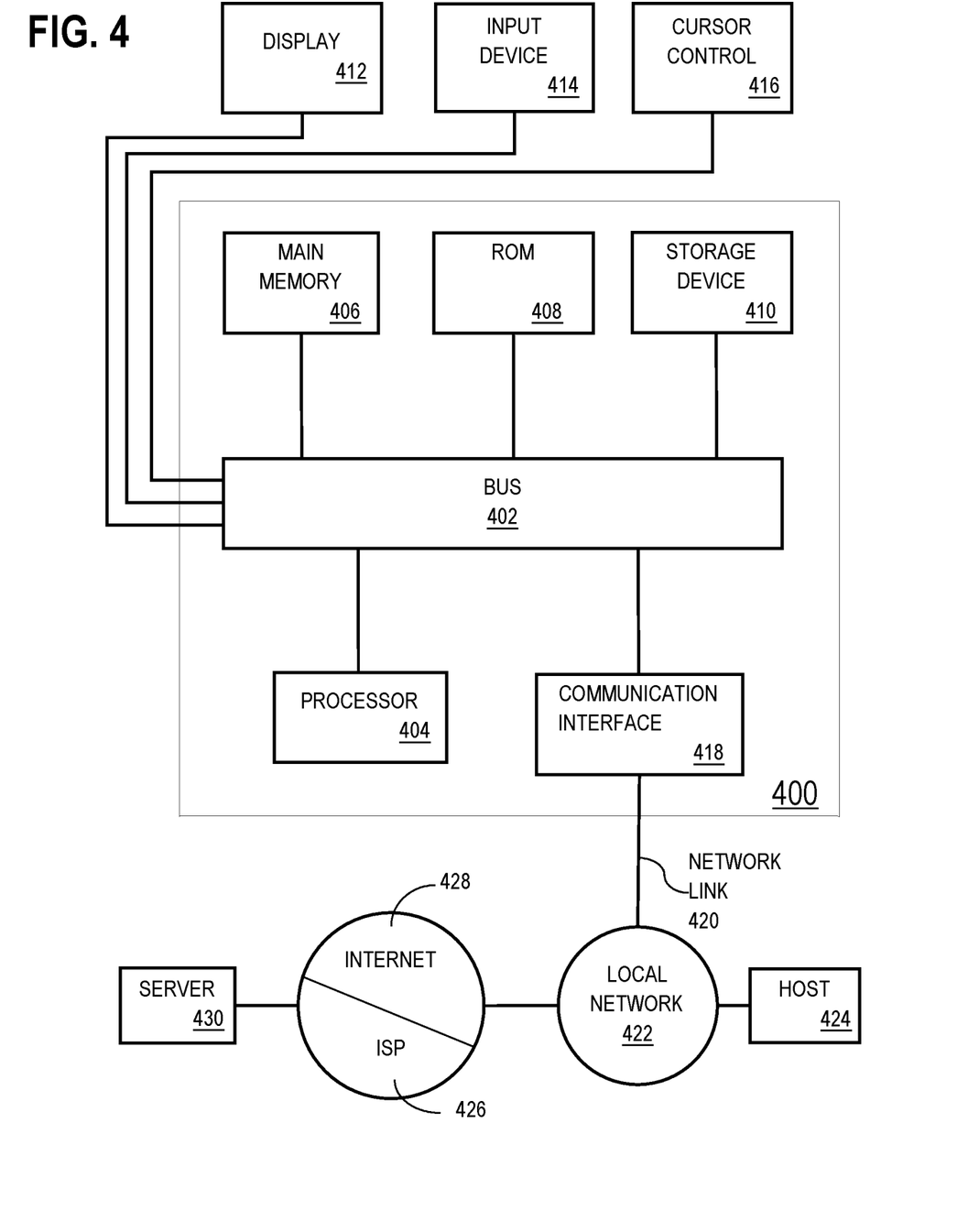
FIG. 4 shows a block diagram illustrating an example computer system in accordance with one or more embodiments.

For example, FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 enables two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving, by a database application, from a user via a computer-user interface, a first user input comprising an incorrect or incomplete query for execution on a database, the query including a first plurality of elements;
   responsive to receiving the query for execution: executing, by the database application, a query validation process, in real-time as a component of a query execution process, at least by:
      determining that a first sequence of element types, corresponding to the first plurality of elements, is unparsable based on a grammar;
      responsive to determining that the first sequence of element types is unparsable:
         selecting a target element type sequence from a plurality of candidate element type sequences based on at least a first similarity value representing a similarity between the first sequence of element types and the target element type sequence identified for the first user input using the grammar,
         wherein each of the plurality of candidate element type sequences, including the target element type sequence, is parsable;
         determining at least one modification of the first plurality of elements that generates a second plurality of elements corresponding to the target element type sequence;
         generating a repaired first query, including the second plurality of elements, by applying the at least one modification to the first plurality of elements; and
      executing the repaired first query by the database application on the database.

2. The non-transitory computer readable medium of claim 1, wherein determining at least one modification comprises:
   traversing the first plurality of elements until a matching operation fails to match the sequence of element types corresponding to the first plurality of elements with at least one sequence of element types that can be parsed using the grammar.

3. The non-transitory computer readable medium of claim 1, wherein the element types comprise specific keywords, table identifiers, or field identifiers.

4. The non-transitory computer readable medium of claim 1, further comprises determining a set of query modifications to the incomplete query based on the information corresponding to the incomplete query.

5. The non-transitory computer readable medium of claim 1, wherein selecting the target element type sequence from a plurality of candidate element type sequences comprises:
   for individual candidate element type sequences of the plurality of candidate element type sequences, determining a similarity with the first plurality of elements; and
   selecting a first candidate element type sequence having the greatest similarity as the target element type sequence.

6. The non-transitory computer readable medium of claim 1, wherein selecting the target element type sequence comprises:
   selecting the target element type sequence from the plurality of candidate element type sequences based on the target element type sequence involving at least number of additions to the first plurality of elements.

7. The non-transitory computer readable medium of claim 1, wherein determining the at least one modification comprises:
   generating the second plurality of elements without modifying the first user input by applying the at least one modification to a copy of the first plurality of elements.

8. The non-transitory computer readable medium of claim 1, wherein the at least one modification comprises a placeholder value that does not correspond to any database field or database value and does not result in generating an executable query.

9. The non-transitory computer readable medium of claim 1, wherein the at least one modification comprises a wildcard symbol representing a plurality of values.

10. The non-transitory computer readable medium of claim 1, wherein repairing the first query comprises applying a second modification to a second unparsable sequence of element types in the first user input.

11. The non-transitory computer readable medium of claim 1, wherein the information comprises a table corresponding to the one or more elements.

12. The non-transitory computer readable medium of claim 1, wherein the information comprises a set of candidate values that can be used for completing the first user input.

13. The non-transitory computer readable medium of claim 1, wherein the information comprises a set of candidate values that can be used in place of a placeholder value that was added to a copy of the first plurality of elements by applying the at least one modification.

14. The non-transitory computer readable medium of claim 1, wherein selecting the target element type sequence comprises:
selecting the target element type sequence from the plurality of candidate element type sequences based on the target element type sequence being most commonly used from the plurality of candidate element type sequences.

15. The non-transitory computer readable medium of claim 1, wherein:
determining that the first sequence of element types corresponding to the first plurality of elements is unparsable comprises:
determining that the first sequence of element types includes an erroneous element based on the grammar; and
selecting a predetermined quantity of the first sequence of element types including the erroneous element;
identifying the plurality of candidate element type sequences comprises:
selecting a set of element type sequences from the grammar including a quantity of elements matching the predetermined quantity; and
selecting the target element type sequence from the plurality of candidate element type sequences comprises:
determining a plurality of similarity values representing similarities between individual candidate element type sequences of the plurality of candidate element type sequences and the target element type sequence; and
selecting a first candidate element type of the plurality of similarity values sequence having the greatest similarity value as the target element type sequence.

16. The non-transitory computer readable medium of claim 15, wherein selecting the target element type sequence from the plurality of candidate element type sequences comprises:
determining a plurality of similarity coefficients corresponding to the plurality of candidate element type sequences using a similarity algorithm that computes a number of shared elements between the first sequence of element types and the individual candidate element type sequences of the plurality of candidate element type sequences; and
selecting a first candidate element type sequence of the plurality of candidate element type sequences having the highest similarity coefficient of the plurality of similarity coefficients as the target element type sequence.

17. The non-transitory computer readable medium of claim 16,
wherein selecting the target element type sequence from the plurality of candidate element type sequences comprises:
determining a maximum achievable similarity coefficient for the first sequence of element types.

18. The non-transitory computer readable medium of claim 17, wherein generating the repaired first query in response to determining that the first sequence of element types is unparsable occurs in 100 milliseconds or less.

19. The non-transitory computer readable medium of claim 1, wherein executing the repaired first query comprises:
receiving approval corresponding to the repaired first query via a computer-user interface, wherein the repaired first query is executed in response to receiving the approval.

20. The non-transitory computer readable medium of claim 1, wherein executing the repaired first query comprises:
parsing the repaired first query using the grammar;
determining information based on the second plurality of elements; and
presenting, using a computer-user interface, the information based on the second plurality of elements.

21. The non-transitory computer readable medium of claim 1, wherein:
the computer-user interface comprises a code-editor application;
the first user input comprises a first portion of the query including the first plurality of elements; and
executing the query validation process comprises: triggering the query validation process based on the first plurality of elements included in the first portion of the query prior to receiving an additional element included in the remainder of the query.

22. A method comprising:
receiving, by a database application, from a user via a computer-user interface, a first user input comprising an incorrect or incomplete query for execution on a database, the query including a first plurality of elements;
responsive to receiving the query for execution: executing, by the database application, a query validation process, in real-time as a component of a query execution process, at least by:
determining that a first sequence of element types, corresponding to the first plurality of elements, is unparsable based on a grammar;
responsive to determining that the first sequence of element types is unparsable:
selecting a target element type sequence from a plurality of candidate element type sequences based on at least a first similarity value representing a similarity between the first sequence of element types and the target element type sequence identified for the first user input using the grammar,
wherein each of the plurality of candidate element type sequences, including the target element type sequence, is parsable;
determining at least one modification of the first plurality of elements that generates a second plurality of elements corresponding to the target element type sequence;
generating a repaired first query, including the second plurality of elements, by applying the at least one modification to the first plurality of elements; and
executing the repaired first query by the database application on the database.

23. The method of claim 22, wherein determining at least one modification comprises:
traversing the first plurality of elements until a matching operation fails to match the sequence of element types corresponding to the first plurality of elements with at least one sequence of element types that can be parsed using the grammar.

24. The method of claim 22, wherein the element types comprise specific keywords, table identifiers, or field identifiers.

25. The method of claim 22, further comprises determining a set of query modifications to the incomplete query based on the information corresponding to the incomplete query.

26. The method of claim 22, wherein selecting the target element type sequence from a plurality of candidate element type sequences comprises:
    for individual candidate element type sequences of the plurality of candidate element type sequences, determining a similarity with the first plurality of elements; and
    selecting a first candidate element type sequence having the greatest similarity as the target element type sequence.

27. The method of claim 22, wherein selecting the target element type sequence comprises:
    selecting the target element type sequence from the plurality of candidate element type sequences based on the target element type sequence involving at least number of additions to the first plurality of elements.

28. The method of claim 22, wherein determining the at least one modification comprises:
    generating the second plurality of elements without modifying the first user input by applying the at least one modification to a copy of the first plurality of elements.

29. The method of claim 22, wherein the at least one modification comprises a placeholder value that does not correspond to any database field or database value and does not result in generating an executable query.

30. The method of claim 22, wherein the at least one modification comprises a wildcard symbol representing a plurality of values.

31. The method of claim 22, wherein repairing the first query comprises:
    applying a second modification to a second unparsable sequence of element types in the first user input.

32. The method of claim 22, wherein the information comprises a table corresponding to the one or more elements.

33. The method of claim 22, wherein the information comprises a set of candidate values that can be used for completing the first user input.

34. The method of claim 22, wherein the information comprises a set of candidate values that can be used in place of a placeholder value that was added to a copy of the first plurality of elements by applying the at least one modification.

35. The method of claim 22, wherein selecting the target element type sequence comprises:
    selecting the target element type sequence from the plurality of candidate element type sequences based on the target element type sequence being most commonly used from the plurality of candidate element type sequences.

36. A system comprising:
    at least one device including a hardware processor;
    the system being configured to perform operations comprising:
        receiving, by a database application, from a user via a computer-user interface, a first user input comprising an incorrect or incomplete query for execution on a database, the query including a first plurality of elements;
        responsive to receiving the query for execution: executing, by the database application, a query validation process, in real-time as a component of a query execution process, at least by:
            determining that a first sequence of element types, corresponding to the first plurality of elements, is unparsable based on a grammar;
            responsive to determining that the first sequence of element types is unparsable:
                selecting a target element type sequence from a plurality of candidate element type sequences based on at least a first similarity value representing a similarity between the first sequence of element types and the target element type sequence identified for the first user input using the grammar,
                wherein each of the plurality of candidate element type sequences, including the target element type sequence, is parsable;
                determining at least one modification of the first plurality of elements that generates a second plurality of elements corresponding to the target element type sequence;
                generating a repaired first query, including the second plurality of elements, by applying the at least one modification to the first plurality of elements; and
            executing the repaired first query by the database application on the database.

37. A method comprising:
    receiving, by a database application, from a user via a computer-user interface, a user input comprising a first portion of a query for execution on a database, the first portion of the query including a first plurality of elements;
    responsive to receiving, from the user via the computer-user interface, an additional element that updates the first plurality of elements: executing a query validation process on the first portion of the query by:
        determining that the first portion of the query is unparsable by identifying a first sequence of element types in a grammar that correspond to the updated first plurality of elements as including an erroneous element using a parser algorithm;
        responsive to determining that the first sequence of element types includes an erroneous element:
            selecting a predetermined quantity of the first sequence of element types including the erroneous element;
            identifying a plurality of candidate element type sequences by selecting a set of element type sequences from the grammar, wherein:
                the set of element type sequences includes a quantity of elements matching the predetermined quantity, and
                each of the plurality of candidate element type sequences is parsable using the grammar;
            selecting a target element type sequence from a plurality of candidate element type sequences by:
                determining, using a similarity algorithm, a plurality of similarity coefficients corresponding to the plurality of candidate element type sequences using a similarity algorithm that computes a number of shared elements between the first sequence of element types and the individual candidate element type sequences of the plurality of candidate element type sequences; and selecting a first candidate element type sequences of the plurality of candidate element type sequences having the highest similarity coefficient of the plurality of similarity coefficients as the target element type sequence;

determining at least one modification of the updated first plurality of elements that generates a second plurality of elements corresponding to the target element type sequence; and generating a repaired first query, including the second plurality of elements, by applying the at least one modification to the first plurality of elements; and receiving approval corresponding to the repaired first query via the computer-user interface.

\* \* \* \* \*